Figure 13:
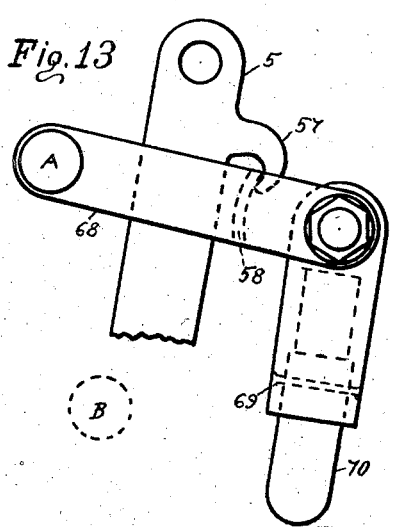

June 23, 1936.  E. GRIESHABER  2,044,903
AUTOMOBILE DOOR CONTROL
Filed Aug. 1, 1935  5 Sheets-Sheet 1
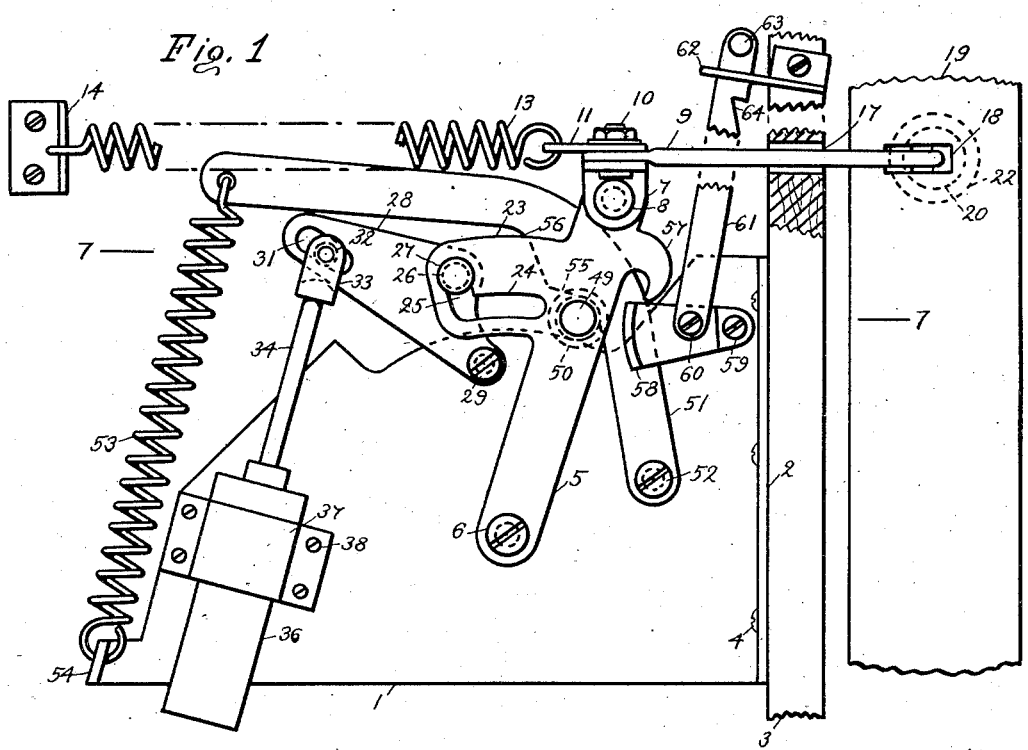
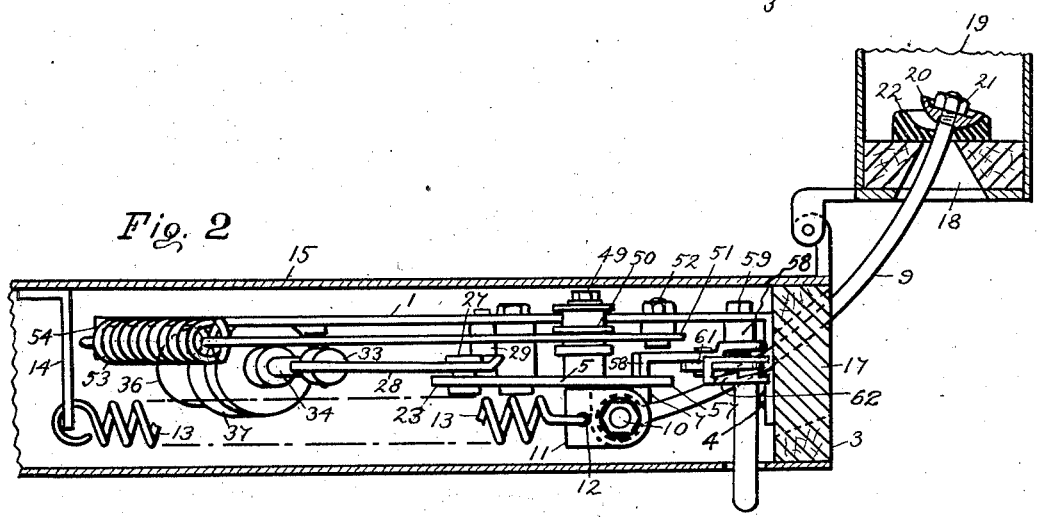
EUGENE GRIESHABER
INVENTOR
BY John P. Nikonow
ATTORNEY June 23, 1936.  E. GRIESHABER  2,044,903
AUTOMOBILE DOOR CONTROL
Filed Aug. 1, 1935  5 Sheets-Sheet 2
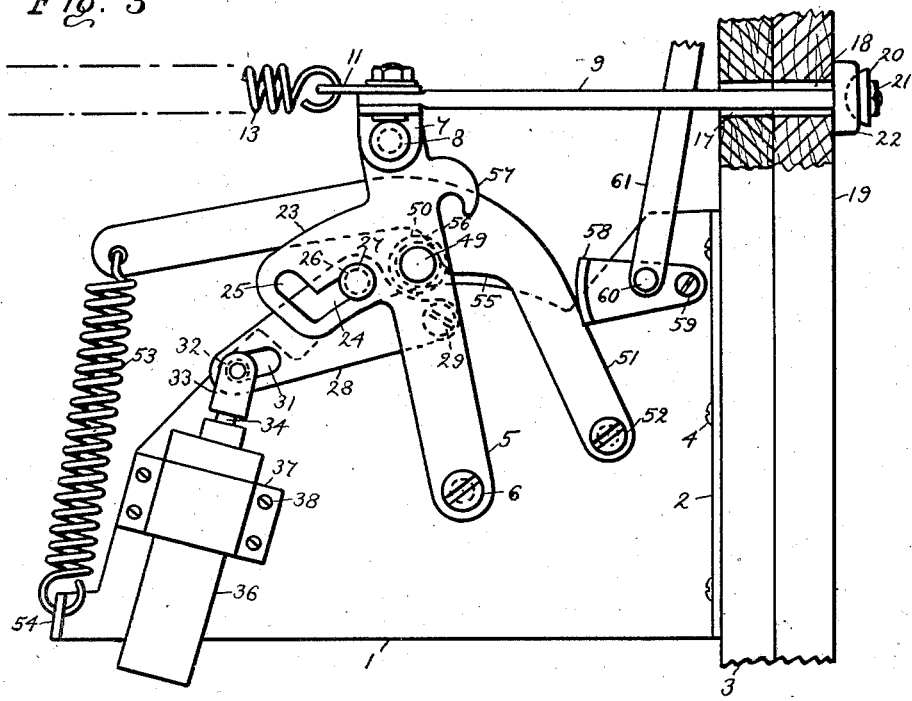
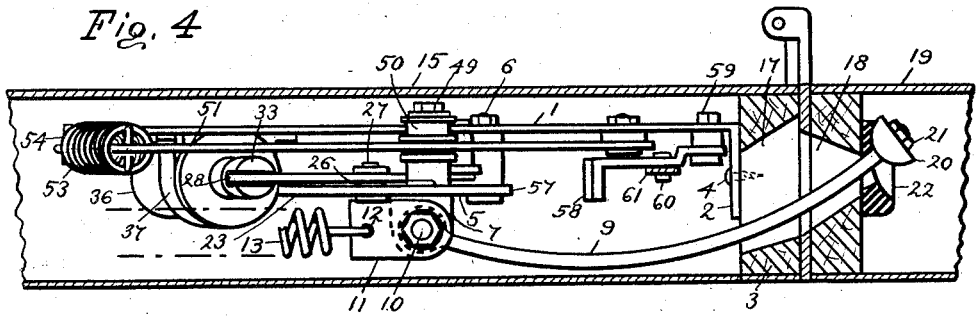
EUGENE GRIESHABER
INVENTOR
BY John P. Nikonow
ATTORNEY June 23, 1936.  E. GRIESHABER  2,044,903
AUTOMOBILE DOOR CONTROL
Filed Aug. 1, 1935    5 Sheets-Sheet 3
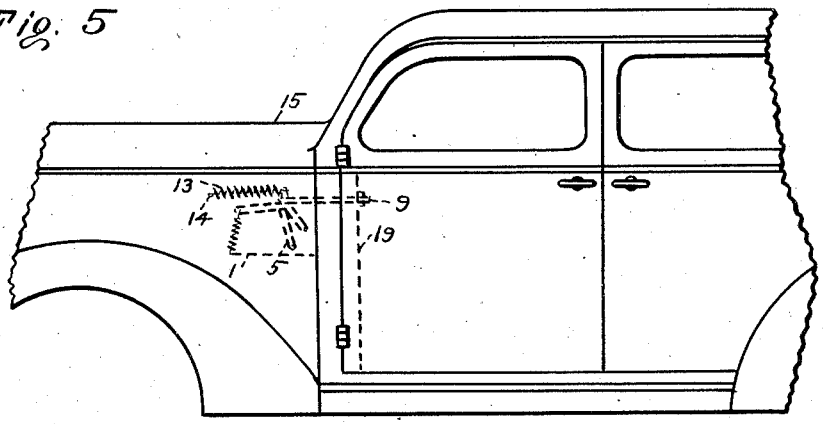
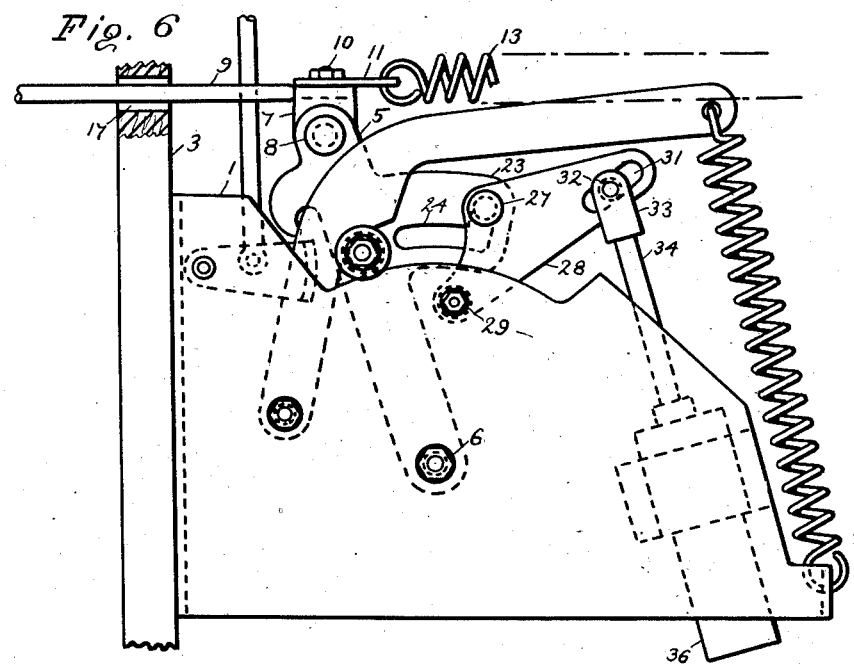
EUGENE GRIESHABER
INVENTOR
BY John P. Nikonow
ATTORNEY June 23, 1936.  E. GRIESHABER  2,044,903
AUTOMOBILE DOOR CONTROL
Filed Aug. 1, 1935   5 Sheets-Sheet 4
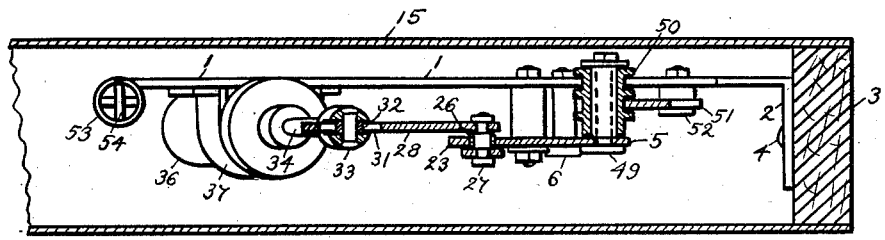
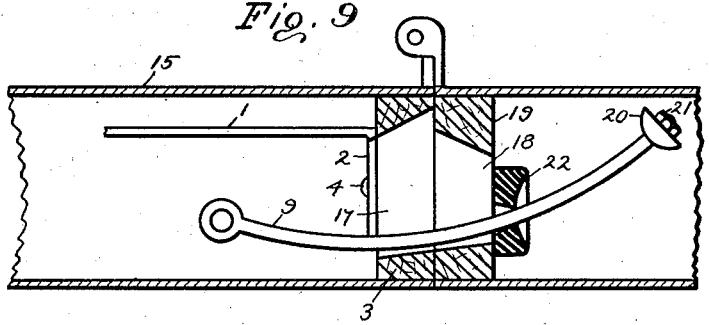
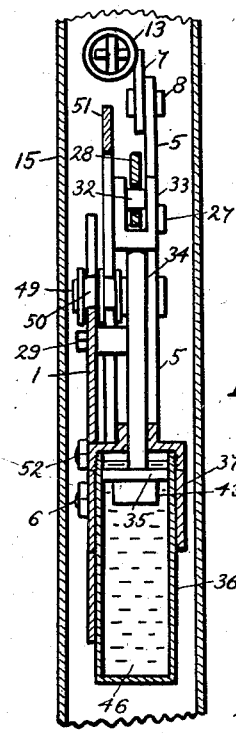
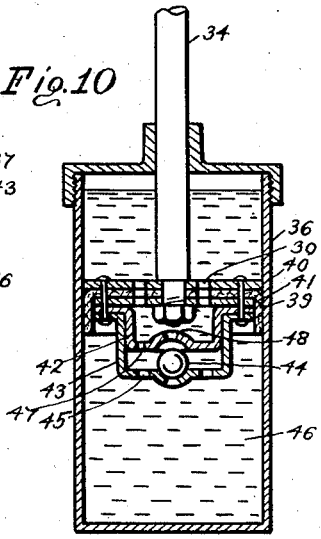
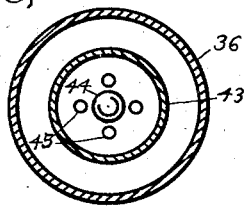
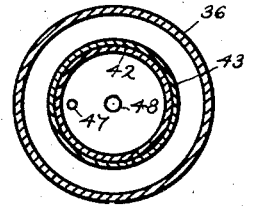
EUGENE GRIESHABER
INVENTOR
BY John P. Nixonow
ATTORNEY June 23, 1936.  E. GRIESHABER  2,044,903
AUTOMOBILE DOOR CONTROL
Filed Aug. 1, 1935  5 Sheets-Sheet 5

EUGENE GRIESHABER
INVENTOR
BY John P. Nikonow
ATTORNEY

Patented June 23, 1936

2,044,903

UNITED STATES PATENT OFFICE 2,044,903

AUTOMOBILE DOOR CONTROL

Eugene Grieshaber, Glendale, N. Y.

Application August 1, 1935, Serial No. 34,154

5 Claims. (Cl. 16—70)

My invention relates to automobile door control and has particular reference to mechanisms for controlling the closing movement of doors of automotive vehicles and for other applications in which such control may be required.

Door checks of various types have been found very desirable for automatic closing of ordinary doors in the buildings, these checks being provided with a retarding action mechanism to prevent sudden slamming of the doors. Such door checks are equally desirable for the doors of automobiles in order to prevent their being slammed too hard by manual handling, or improper closing with the resultant danger that the door may become opened when the vehicle is in motion.

One of such door closing devices has been described in the Patent No. 2,005,457, issued to Dubitsky et al. This device, however, has certain disadvantages in that the door cannot be closed quickly by hand if it is so desired, also that because of a single connection between the closing lever and the dash pot, the diameter of the latter must be relatively large, rendering the mounting of the device between the walls of the door structure rather difficult. Such a large diameter, short stroke dash pot requires very fine passages for the liquid, and it is difficult to maintain such fine passages at all times in perfect condition and free from obstructions.

In my present construction I have overcome these defects of my earlier design by providing a door closing link which closes the door under action of a spring controlled by a dash pot, but which also becomes disconnected from the door structure if the door is quickly closed by hand. The link continues its independent action, however, and completes the closing if the door has not been properly closed by hand.

Another improvement I have added to this construction resides in the use of an intermediate lever between the main door closing lever and the piston of the dash pot, this arrangement permitting materially to increase the stroke of the piston with corresponding reduction of its diameter and increase of the size of passages for the liquid. The reduced diameter of the dash pot renders the device more narrow and suitable for mounting between the side walls of an automobile door.

It has been found that during warm weather it is desirable to leave the doors partly open for ventilation. It is dangerous, however, to leave the door unlocked as it may swing open and cause an accident. With my spring closing device it is possible to provide a movable rubber bumper which prevents complete closing of the door, but the latter cannot become fully opened being under constant closing tension from the closing spring. I connect my movable pad or bumper with a handle which controls the closing mechanism by disconnecting it if so desired. I add two more positions to this handle: one, with the mechanism connected and bumper still hidden in the door structure, and the other, with the mechanism connected and the bumper moved out into the operative position in which it keeps the door partly open.

I have added also certain other improvements in construction which are more fully described in the accompanying specification and drawings in which—

Figure 14:
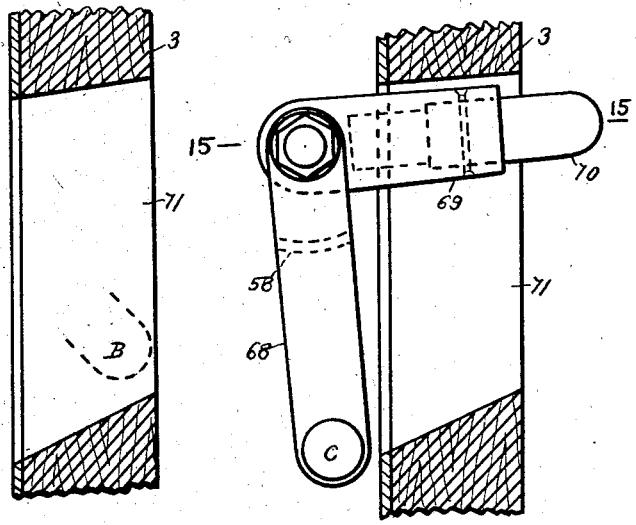
Figure 15:
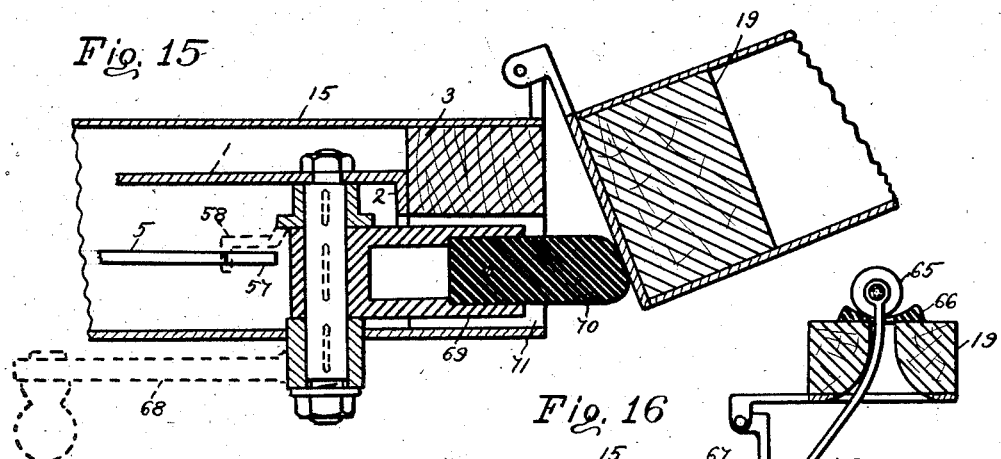
Figure 16:
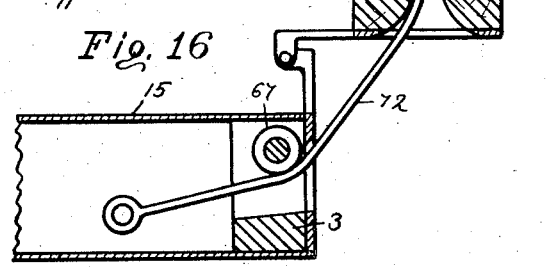
Figure 17:
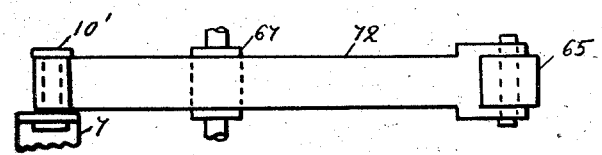

Fig. 1 is an elevation of my device with the door in an open position, Fig. 2 is a top plan view of the same showing the door structure in section, Fig. 3 is an elevation showing the door closed, Fig. 4 is a top plan view of the same partly in section, Fig. 5 is a fractional view of an automobile body showing my device in dotted lines, Fig. 6 is a rear view of my device, Fig. 7 is a sectional view taken on the line 7—7 of Fig. 1, Fig. 8 is a vertical sectional view taken through the dash pot, Fig. 9 is a view of the door structures in a closed position showing also the closing link disconnected from the door, Fig. 10 is a detail view of the dash pot, Figs. 11 and 12 are cross-sectional views of the same, Fig. 13 is a view of a combined door mechanism locking latch and movable bumper with the latch in the operative position engaging the closing lever, Fig. 14 is a view of this device with the bumper in the operative position preventing closing of the door, Fig. 15 is a sectional view taken on the line 15—15 of Fig. 14, Fig. 16 is a partial view of a modified device in which a resilient closing link is used, and Fig. 17 is a side view of this resilient link.

My device consists of a frame formed of a steel plate 1 provided with a flange 2 which is attached to inner side of a stationary portion of a door structure 3 by screws 4. A lever 5 is rotatively mounted on a pivot 6 fastened to the plate 1. A bracket 7 is pivotally mounted on the upper end of the lever at 8 and supports one end of a link 9 on a pivot or bolt 10. A plate 11 is also mounted on the pivot 10 and is provided with a hole 12 for one end of a closing spring 13 the other end of which is attached to a bracket 14 mounted on a stationary portion of an automobile body 15. The link 9 is curved and passes through slots 17 and 18 in stationary 3 and movable 19 portions of the door structure.

The link 9 is curved as shown so as to facilitate its movements inside of the door structure for all positions of the door. For the same reason the slots 17 and 18 are made of sufficient width. The free end of the link 9 has a rounded or cup-shaped washer 20 held by a nut 21 and resting against a hollow or cup-shaped rubber pad 22. The pad is shaped so as to provide resting cushion for the washer 20 for all positions of the link 9. The lever 5 has a side extension 23 with a slot 24 arranged on an arc of a circle concentric with the pivot 6. This slot has a radial extension 25. The inner side of the slot extension serves as a cam for pressing against a roller 26 on a pin 27 mounted on an intermediate lever 28. The lever 28 is supported on a pivot 29 fastened by its end in the plate 1. The other end of the lever 28 has a slot 31 for a roller 32 supported in a forked end 33 of a rod 34 the other end of which is attached to a piston 35 in a dash pot 36. The latter is fastened to the plate 1 by a yoke 37 and screws 38. The piston 35 has a leather packing washer 39 clamped between metal plates 40 and 41 which also support cup-shaped members 42 and 43. These members have round depressions for a ball valve 44. The member 43 has relatively large holes 45 permitting free circulation of a dampening liquid 46, while the member 42 has a very small hole 47 restricting the circulation of the liquid. With this arrangement the pistons can move easily and rapidly upward when the ball rests on the lower member 43 uncovering a large hole 48 in the center of the depression in the upper member, the liquid passing through the large holes 45 and 48. With the downward movement of the piston the ball rises and presses against the depression in the upper member, closing the hole 48, so that the liquid can pass only through the small hole 47, thereby retarding the piston movement.

A pin 49 is fastened by its end in the lever 5. This pin supports a roller 50 with two grooves. The outer groove slides on an arcuate edge of the plate 1 concentric with the pin 6, this edge serving only to support the pin during movement of the lever. The inner groove rests against a cam-shaped edge of a lever 51 supported on a pivot 52 mounted on the plate 1. The other end of the lever 51 is fastened to one end of a supplementary spring 53. The other end of this spring is attached to a lug 54 on the plate 1. The edge of the lever 51 has two curvatures, one nearly concentric with the pivot 6, marked 55, and the other, rising steeply, marked 56. The lever 5 has a hook 57 which can be engaged by a latch 58 pivoted on the plate 1 at 59 and connected at 60 to a bar or rod 61. The latter extends upward at an angle and passes through a bracket 62. The rod 61 can be pulled by its handle 63 and it has a notch 64 which can be hooked at the side of the slot in the bracket 62 thereby locking the rod and the latch 58 in its upward position in which it engages the hook 57 thereby preventing the movement of the link 9 and operation of the spring 13.

The operation of my device is as follows.

When the door 19 is fully open, the lever 5 is turned to the right and the spring 13 fully extended as shown in Figs. 1 and 2. If it is desired to hold the door in the open position, then the rod 61 is pulled up and locked in this position, the latch 58 engaging the hook 57. The door then will remain open, or it can be closed by hand the closing mechanism being rendered inoperative. The link 9 will then slide freely in the slots 17 and 18 as shown in Fig. 9.

With the latch 58 disconnected from the hook 57 the link 9, being pulled by the main spring 13, will tend to close the door. The first portion of the closing movement will be retarded or dampened, however, by the dash pot 36. The lever 5, being turned by the spring 13, will bear on the roller 26 by the side of the slot 25, thereby turning the lever 28 and pushing down the rod 34 with the piston 35. The ball 44 being raised by this action, the liquid 46 will flow through the small hole 47 only, thereby retarding the piston movement. The piston will move, however, only until the roller 26 reaches the concentric slot 24. Then the roller will slide freely in this slot, permitting the lever 5 to move rapidly under action of the spring 13. The effect will be that the door, moving slowly at first, at the end of its movement will close quickly. The lever 51 during the first portion of the door movement will remain almost stationary while the roller 50 moves under the almost concentric cam portion 55 of the lever 51. The spring 53 will remain inactive during this period. At the end of the first period, when the force of the spring 13 will be largely spent, the roller 50 will enter under the steep portion 56 of the lever 51. The lever 51 will then exert pressure on the roller, pushing the lever 5 further to the left by the action of the supplementary or auxiliary spring 53. At the end of the closing movement the door, therefore, will move rapidly, being disconnected from the dash pot, and with greater force, being under the combined action of the springs 13 and 53, so that it will shut tight, overcoming the resistance of an ordinary door latch spring. When opening the door, the ball 44 remains at the bottom of the member 43, so that the piston moves fast, the large holes 45, 48 and 30 offering little resistance to the flow of the liquid.

The slow closing movement of the door is important in order to avoid any possibility of injuring a person who may be standing in the door or having his foot or hand in the opening. Sometimes, however, it is desired to close the door quickly, and with my improved mechanism it is possible to do so by hand at any time while the door is being closed by the spring action. This is made possible by the one-way action of the link 9 which can pull only at the door 19 but slides freely if the door is moved faster than the link whose movement is retarded by the dash pot. If the door is quickly closed, as shown in Fig. 9, then the link 9 will slide inside of the door space and will gradually come to the full closing position illustrated in Fig. 4.

It is understood, of course, that the closing mechanism may be mounted either in the stationary or in the movable portions of the door structure, and can be made for right or left hand mounting.

The link 9, instead of being rigid, can be made of a flexible resilient steel strip or bar as shown in Figs. 16 and 17, with a roller 65 on the end resting against a rubber cushion or pad 66. A guiding roller 67 is mounted in the stationary portion of the door structure.

The latch 58 can be operated by a handle 68 extending outside of the structure of the body 15 as shown in Figs. 13, 14 and 15. The latch can be combined with a socket 69 for a rubber bumper 10 passing in a slot 71 in the door frame 3. This rubber bumper can be used to keep the door slightly ajar but under tension from the spring 13 to prevent its rattling or tendency to open further.

In the position A the closing mechanism is made inoperative by the latch 58 engaging the hook 57, the bumper is also inoperative. In the position B (Fig. 13) the spring mechanism is released but the bumper is still inoperative. In the position C the spring mechanism is also operative, and the bumper is placed in the operative position, being turned slightly above the horizontal line to prevent its turning back by the pressure from the door 19 under pull of the spring 13. The movements of the stationary and movable portions of the door being relative, this mechanism will work equally well when placed in the movable portion of the door structure.

It is understood, of course, that the practical embodiment of my device can be modified in various ways without departing from the spirit of my invention.

I claim as my invention:

1. In an automobile door control, the combination of a frame supported in a door structure, a link slidably fitted in the adjacent stationary and movable portions of said door structure, an enlargement on the end of said link, a lever rotatively mounted on said frame, the end of said lever being pivotally connected to the other end of said link, a spring adapted to turn said lever and to pull said link, said enlargement on the link being adapted to engage the outer of said door portions only when said link is being pulled, and being further adapted to slide freely in said door portions when said door is being manually closed, a dash pot with a piston mounted on said frame, a second lever rotatively mounted on said frame, one end of said second lever being operatively connected with said piston, operative connection between said levers, said first lever being adapted during the first portion of its door closing movement to move said piston through said second lever, said connection between the levers being adapted to become inoperative during the second portion of the door closing movement, a supplementary spring, and means to render said supplementary spring operative during said second portion of the closing movement of the first lever.

2. In an automobile door control, the combination of a frame supported in a door structure, a link slidably fitted in the adjacent stationary and movable portions of said door structure, one end of said link being adapted to engage the outer of said portions, a spring operatively connected to the other end of said link, said spring being adapted to close said door through said link, a dash pot with a piston mounted on said frame, and a plurality of levers operatively connecting said spring end of the link with said piston, said lever connection being adapted to remain operative during the first portion of the door closing movement of said link only.

3. In an automobile door control, the combination of a frame supported in a door structure, a link slidably fitted in the adjacent stationary and movable portions of said structure, a spring operatively connected with one end of said link, an enlargement on the other end of said link adapted to engage the outer of said portions when said link is being pulled by said spring and adapted to release said outer portion when said door is being manually closed, a lever rotatively mounted on said frame, the end of said lever being pivotally connected with said spring end of the link, a dash pot with a piston operatively connected to said lever, a hook on said lever, a rod slidably supported on said structure, a handle on said rod, a locking latch for said hook operatively connected to said rod and adapted to render said spring and lever inoperative when engaging said hook, and means to releasably lock said rod in its operative position with said latch engaging said hook.

4. In an automobile door control, the combination of a frame supported in a door structure, a link slidably fitted in the adjacent stationary and movable portions of said structure, a lever rotatively mounted on said frame and connected by its end to said link, a spring connected to said end of the lever, the other end of said link having an enlargement adapted to engage the outer of said portions only when said link is being pulled by said spring for closing said door, a dash pot mounted on said frame, a second lever connecting said dash pot with said first lever, a third lever rotatively mounted on said frame, a second spring connected to said third lever, and a cam-like connection between said first and third levers adapted to render said second spring operative during the second portion of the closing movement of said first lever only.

5. In an automobile door control, the combination of a frame supported in a door structure, a link slidably passing through the stationary and movable portions of said door structure, a yieldable means supported on said frame and connected with one end of said link, said yieldable means being adapted to pull said link through said door portions, means to retard the movement of said yieldable means, said retarding means being adapted to be ineffective when said door is being opened, an enlargement on the free end of said link having a convex side directed toward said yieldable means, and a resilient washer encircling the link and fastened to said door portion, said washer having a concave recess adapted to receive said enlargement and to permit a rolling motion therebetween when the door is being closed by the pull of the yieldable means.

EUGENE GRIESHABER.